Aug. 8, 1967     A. G. RICARD     3,334,845

HIGH-SPEED AIRCRAFT

Filed March 17, 1965

United States Patent Office  3,334,845
Patented Aug. 8, 1967

3,334,845
HIGH-SPEED AIRCRAFT
Armand G. Ricard, Viroflay, France, assignor to Societe Anonyme des Ateliers d'Aviation Louis Breguet, Paris, France, a company of France
Filed Mar. 17, 1965, Ser. No. 440,401
Claims priority, application France, Apr. 6, 1964, 969,895
3 Claims. (Cl. 244—120)

When an aircraft flies at high speed at low level it is subjected to violent jolts produced, inter alia, by the repercussion on the flight of the relief of the ground. Even if the flights are relatively short, such jolts may be very painful to the aircraft crew.

The attempt has been to obviate these disadvantages by mounting the seats on the aircraft structure by means of shock absorbers but the latter have to be given long lengths of travel because of the amplitude of the aircraft response to jolts, and such long shock-absorber travel makes reading of the instrument panel in particular very difficult.

The object of this invention is an improvement to aircraft, and more particularly to high-speed low-level aircraft, such as military aircraft, to obviate the above disadvantages.

Such improvement consists essentially in mounting the aircraft cabin or crew station resiliently with respect to the rest of the aircraft.

According to one embodiment of the invention, the cabin is articulated to the aircraft fuselage about a transverse axis about which it can oscillate, and is also connected to said fuselage via a double-action shock-absorber, means preferably being provided so that the cabin can be locked in different positions as necessary, for example during normal-altitude flights or for take-off and landing.

The invention is illustrated by way of example in the accompanying drawings, in which.

Figure 1:
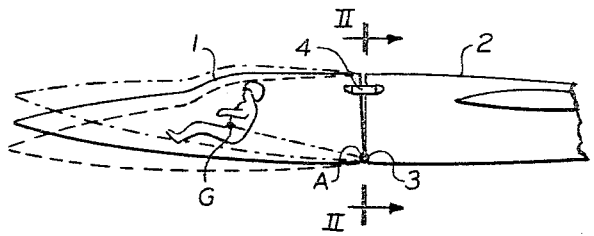
FIG. 1 is a diagrammatic partial longitudinal section of an improved aircraft according to the invention.
Figure 2:
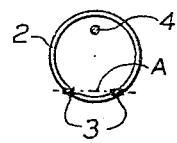
FIG. 2 is a section on II—II in FIG. 1.

In FIGS. 1 and 2, an aircraft cabin is articulated to the fuselage 2 about a transverse axis A perpendicular to the central vertical plane of the aircraft, for example by means of hinges 3.

A double-action shock-absorber 4 also connects the cabin to the rest of the aircraft so that the cabin can oscillate between the end positions shown in chain-dotted lines in FIG. 1, it being assumed that the remainder of the aircraft is fixed.

In the example illustrated, the articulation axis A is provided at the bottom of the cabin and the shock absorber at the top. Any other suitable arrangement would be possible. In operation, the center of gravity of the cabin describes an arc of a circle about A. It is advantageous for distance GA to be relatively large in order to avoid excessive oscillation angles.

FIGS. 3 to 6 show how the shock absorber 4 may be constructed.

The fuselage framework 2 bears a frame 5 on which oleo-pneumatic shock absorbers 7a and 7b mounted in opposition to one another are mounted by lugs 6. These shock absorbers comprise in known manner an oil piston 8a or 8b provided with partitions with conventional valves and an air-oil separator 9a or 9b. The rods 10a, 10b of the pistons 8a, 8b are articulated to a lever 12 via a pivot 11.

The lever 12 pivots in the middle on a pivot 13 borne by the piston rod 14 of a double-acting hydraulic jack 15 secured to the frame 5 at 16. Connections 17 and 18 enable the jack to be actuated in either direction.

At its free end the lever 12 is articulated by a hollow pivot 19 to link 20 which is pivotally connected at 21 to a member 22 fixed to the oscillating cabin 1.

Figure 4:
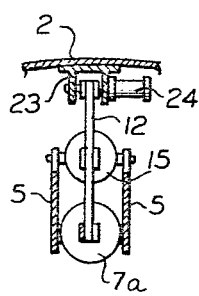
FIG. 4 is a section on the line IV—IV in FIG. 3.

The head of link 20 slides in a U-guide 23 secured to the fuselage framework (FIG. 4). On the outside the guide 23 bears two locking jacks 24 and 25 whose piston rods can be engaged in the hollow pivot 19 to keep the head of the link applied to one or other of the stops 26 and 27 of the guide 23.

Figure 3:
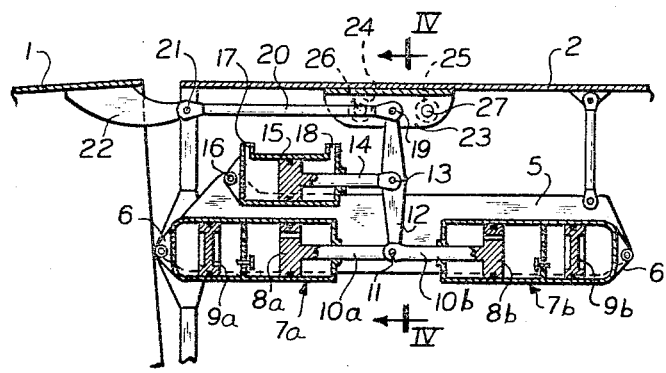
FIG. 3 is a detail to an enlarged scale of the shock-absorber in the shock-absorbing position.

Operation is as follows:

In the position illustrated in FIG. 3, link 20 is unlocked and jack 15 is locked in the central position so as to move the cabin 1 away from the fuselage and enable it to oscillate.

The oscillations of the cabin 1 are transmitted via link 20 to lever 12 which can move between the stops 26 and 27, its movement being damped by the shock absorber 7a and 7b. The air pressure at the bottom of the shock absorber 7b must be greater than that in the shock absorber 7a so as to make up for the deadweight of the cabin 1.

Figure 5:
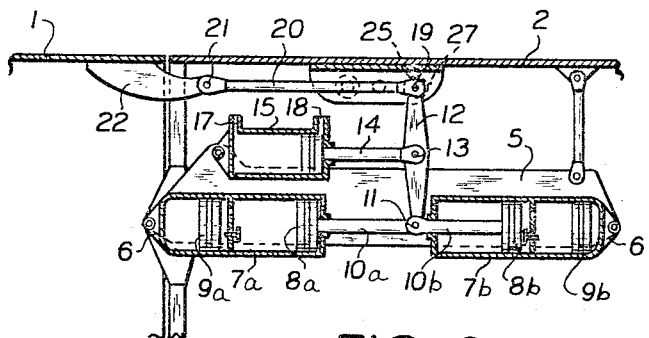
FIG. 5 is a similar view to FIG. 3 showing the cabin locked in the raised position for high-altitude flight.

In FIG. 5 jack 15 is extended to bring the head of the link 20 against the stop 27 of guide 23 and jack 25 is extended to lock the head. The cabin is locked in the upper position against the fuselage so that the aircraft has a better aerodynamic performance at high speeds.

Figure 6:
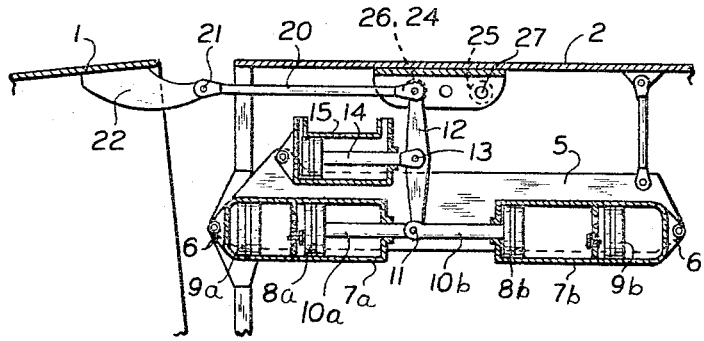
FIG. 6 is a similar view of the cabin locked in the lowered position for take-off or landing.

In FIG. 6 jack 15 is retracted to the maximum and applies the head of link 20 to stop 26; jack 24 also locks link 20. The cabin is locked in the bottom position to give better visibility to the pilot for take-off and landing.

The above-described mechanism occupies very little space and could be housed flat against the fuselage wall thus making the maximum amount of space available in the fuselage.

In particular, it would be possible to use a single mechanism combining the operation of the two shock absorbers and the jack hereinbefore described.

Of course, modifications can be made to the above embodiments, inter alia by substitution of equivalent technical means, without thereby departing from the scope of this invention.

I claim:

1. A high-speed low-level aircraft comprising a cabin and a fuselage, said cabin being articulated to said fuselage about a transverse axis and being also connected to said fuselage by a double-acting shock absorber and wherein means are provided for locking the cabin with respect to the fuselage, the cabin being connected to the double-acting shock absorber via a lever whose pivot can be displaced in order to move the cabin away from the fuselage and enable it to be brought into at least one locking position.

2. A high-speed low level aircraft as claimed in claim 1, wherein the double acting shock absorber is formed by two opposed shock absorbers, and said lever is articulated to said opposed shock absorbers and to a link which connects it to the cabin, the link head being movable in a guide between two stops.

3. A high-speed low level aircraft as claimed in claim 2, wherein means are provided to enable the link head to be locked on either of said stops.

References Cited

UNITED STATES PATENTS

| | | | |
|---|---|---|---|
| 2,535,164 | 12/1950 | Seibel | 244—120 X |
| 2,736,523 | 2/1956 | Chaplin | 244—120 X |
| 2,872,137 | 2/1959 | Gluhareff | 244—120 |

MILTON BUCHLER, *Primary Examiner.*

A. E. CORRIGAN, *Assistant Examiner.*